United States Patent Office 3,148,213
Patented Sept. 8, 1964

3,148,213
TETRAETHYLTHIURAM DISULFIDE RECOVERY PROCESS
Isaac M. Singer, Jr., Houston, Tex., assignor to E. I. du Pont de Nemours and Company, Wilmington, Del., a corporation of Delaware
No Drawing. Filed Oct. 16, 1961, Ser. No. 145,446
3 Claims. (Cl. 260—567)

This invention relates to the preparation and isolation of tetraethylthiuramdisulfide.

Various processes are known for the preparation of tetraethylthiuramdisulfide. See, for example, Counts, Nelson and Trutna U.S. Patent No. 2,777,878, issued January 15, 1957.

Known methods of tetraethylthiuramidisulfide manufacture result in aqueous dispersions or slurries of the particulate solid disulfide. The desired relatively pure disulfide is recovered by conventional means for separating liquid-solid systems into the respective components, such as by filtration or centrifuging, followed by a drying step.

These prior art recovery methods have the disadvantage of requiring costly equipment. In addition, the prior art recovery methods result in a product that has a tendency to agglomerate and is dusty. Also, rinsing of filter cake with warm water to cleanse the product of undesired impurities results in a pollution problem during subsequent disposal of the waste aqueous liquors.

According to the present invention, a method has been discovered for recovery and isolation of dry, substantially pure tetraethylthiuramdisulfide from aqueous dispersions containing this compound.

The beginning dispersion can be made in any convenient way and can be, for example, the product of the Counts et al. process referred to above. The dispersion will ordinarily have a solid tetraethylthiuramdisulfide concentration in the range from about 0.5% to 25% by weight, and preferably from about 3% to 7%. Relatively low concentrations result in decreased yield of the desired disulfide, increased pollution, and increased heat load in the melting step. Relatively high concentrations tend to increase the slurry handling difficulties.

The beginning aqueous dispersion is heated to a temperature above the melting point of tetraethylthiuramdisulfide at the pressure used and below a temperature of about 85° C. This will ordinarily be done at atmospheric pressure where the melting point of the disulfide is about 69° C. Temperatures above about 85° C. should be avoided, at least for too long a time, because of the loss of quality and increased decomposition. It is preferable to minimize decomposition by operating at temperatures close to the melting point, for example at 70° C. to 75° C.

Any convenient method of heating the dispersion until the disulfide becomes liquid can be used, such as use of circulating heat exchange media, electrical platens, jacketed heat exchangers, and the like. It is desirable to maintain the disulfide-water mixture at the elevated temperature for the minimum time possible to avoid decomposition of the product.

It is highly preferred to heat the dispersion by direct charge with steam, sufficient to raise the temperature as stated above because this permits minimum contact of the disulfide and water at the elevated temperature prior to separation. This can be accomplished readily in any suitable apparatus, such as an internal recirculation steam heater, a steam jetted pipe line mixer, or the like, as will readily be understood by persons skilled in the art. Residence times at elevated temperatures of 10 seconds to 2 minutes are easily obtainable with equipment of this type, which results in no measurable decomposition. The internal recirculation steam heater is advantageous in that the components being admixed are generally maintained during heating with the melt slurry constituting the continuous phase and the steam the discontinuous phase of the system. The use of saturated steam, rather than superheated steam, is preferred because of minimized heat transfer difficulties and to minimize the temperature to which the disufide is exposed. It is also preferred to avoid excessive turbulence during mixing and thus minimize separation of disulfide particles from the aqueous system.

According to the present invention, the melt aqueous disulfide is promptly centrifuged to separate the molten disulfide and water from each other. The disulfide is then recovered as a solid by cooling.

Separation of the components (disulfide and water) by centrifuging can be conveniently accomplished in any suitable liquid-liquid centrifugal separator, of which many are commercially available. Satisfactory apparatus are identified as centrifugal decanters, solid bowl centrifuges, disc bowl centrifuges, and the like. The use of centrifugal separation is important to provide a short hold time and thus avoid undesired decomposition and loss of quality.

It is preferred that the total time from initial steam contact with the disulfide until separation of the disulfide and water does not exceed five minutes to minimize undesired product discoloration and degradation and resultant yield loss. Surprisingly, practice of this invention in such short a time enables the entire operation to be carried out without the disulfide dissolving in the water over and above its solubility at the lower starting temperature, even though both components are hot.

It will also clearly be understood that the present invention lies not in the simple separation of solid tetraethylthiuramdisulfide from an aqueous liquid, as described in the aforementioned Counts et al. patent. The present liquid-liquid separation overcomes the disadvantages of the prior processes as described above.

Cooling and recovery of the separated, highly pure tetraethylthiuramdisulfide is effectively carried out, according to one embodiment of this invention, by flaking the disulfide on a cooled rotary drum flaker. The drum can be of conventional design, i.e. internally cooled as by circulating cold water and mounted for rotation above a coating pan containing the separated liquid disulfide. After rotation on the cool drum surface, the cooled solid disulfide is easily flaked from the drum surface by means of a suitable scraper, doctor blade, or the like.

Best results are obtained in the practice of this invention when the molten disulfide is neutral or on the acid side because product degradation and yield losses are minimized. Usually, a higher pH indicates the presence of unreacted sodium diethyl dithiocarbamate. This is readily adjusted by suitable modification of the manufacturing process for the tetraethylthiuramdisulfide.

Practice of the present invention produces a dry, flaky, 99+% pure, free-flowing, non-caking tetraethylthiuramdisulfide.

This process can of course be operated batchwise or in a continuous or semi-continuous operation, and many include conventional expedients such as a hold-up tank preceding the heating step, or the like.

This invention will be further illustrated by the following examples.

Example 1

A 4% by weight tetraethylthiuramdisulfide slurry in water is heated to 75° C. with 10 p.s.i.g. steam continuously in a pipeline direct steam heater at a rate of 0.86 gallon per minute. The resultant mixture of the molten disulfide and water is fed to a tubular centrifuge. The centrifuge is a standard laboratory model, 1¾ inches inside diameter by 8 inches long, rotating at a speed of 20,000 r.p.m. The centrifuge continuously separates the components into an aqueous stream and an organic stream. The aqueous layer which is sampled and discarded contains 0.05% tetraethylthiuramdisulfide. The organic stream is fed to the dip (feed) pan of a 1 square foot rotary flaker chilled with 25° C. cooling water. The resultant flaked organic product analyzes 99.2% tetraethylthiuramdisulfide and 0.04% water. The yield is 99.5%.

*Example 2*

Example 1 is repeated except that there is used a 10% by weight slurry of tetraethylthiuramdisulfide in water with heating to 78° C. The water stream contains 0.01% tetraethylthiuramdisulfide, and the organic stream from the centrifuge analyzes 98.5% disulfide and 0.2% water. The molten organic stream is flaked on a rotary drum flaker.

*Example 3*

Example 1 is repeated except that the slurry is melted indirectly by steam in a 20 foot length of jacketed ½-inch pipe and the molten product from the centrifuge is poured into a stainless steel pan and allowed to solidify. Results are excellent as in that example.

The invention claimed is:

1. The process of recovering tetraethylthiuramdisulfide from a 0.5–25% by weight dispersion of solid tetraethylthiuramdisulfide in water comprising heating said dispersion to above the melting point of tetraethylthiuramdisulfide and below about 85° C., centrifuging the resulting aqueous melt to separate the molten tetraethylthiuramdisulfide from the aqueous phase, the heating and centrifuging steps being carried out within a total time of less than about five minutes, and cooling the separated tetraethylthiuramdisulfide.

2. The process comprising (a) taking an aqueous dispersion of 0.5–25% by weight tetraethylthiuramdisulfide; (b) introducing directly into said dispersion stream in an amount sufficient to melt said tetraethylthiuramdisulfide while not exceeding about 85° C. to form a liquid-liquid aqueous-disulfide mass; (c) separating said molten disulfide by liquid-liquid centrifugal separation from said mass; and (d) cooling said molten disulfide at least sufficient to solidify said tetraethylthiuramdisulfide; said process steps (b) and (c) being carried out within a total time of less than about five minutes.

3. The process as set forth in claim 2 wherein said cooling is accomplished on the surface of a rotary drum flaker.

References Cited in the file of this patent

UNITED STATES PATENTS

| | | |
|---|---|---|
| 2,010,439 | Riegler | Aug. 6, 1935 |
| 2,169,275 | Murphy | Aug. 15, 1939 |
| 2,751,416 | Madlere et al. | June 19, 1956 |
| 2,777,878 | Counts et al. | Jan. 15, 1957 |